United States Patent [19]

Roberts et al.

[11] Patent Number: 5,534,303
[45] Date of Patent: Jul. 9, 1996

[54] COATING SOLUTION FOR TREATING BASEMENT WALLS

[75] Inventors: Michael G. Roberts, Akron, Ohio; Charles E. Bolen, 2346 Short Hills Dr., Akron, Ohio 44333

[73] Assignees: Ozko, Inc.; Charles E. Bolen, both of Akron, Ohio

[21] Appl. No.: 453,566

[22] Filed: May 26, 1995

Related U.S. Application Data

[60] Continuation of Ser. No. 221,039, Mar. 31, 1995, abandoned, which is a division of Ser. No. 632,130, Dec. 20, 1990, Pat. No. 5,362,531.

[51] Int. Cl.$^6$ .................................. B05D 1/02; B05D 5/10
[52] U.S. Cl. ................ 427/385.5; 427/421; 264/DIG. 8; 52/515; 52/516; 52/517
[58] Field of Search .................................. 427/385.5, 421; 264/DIG. 8; 52/515, 516, 517

[56] References Cited

U.S. PATENT DOCUMENTS 4,536,454  8/1988  Haasl ..................................... 427/420

FOREIGN PATENT DOCUMENTS 0135998  4/1985  European Pat. Off. ............... 427/421

*Primary Examiner*—Peter A. Szekely
*Attorney, Agent, or Firm*—Andrus, Sceales, Starke and Sawall

[57] ABSTRACT

A solvent mixture of a petroleum distillate and toluene is disclosed. The solvent is used to dissolve a hydrocarbon resin and block copolymers of styrene and isoprene or styrene and butadiene and the solution is applied to newly constructed basement walls to provide a water-resistant elastomeric coating on the walls.

4 Claims, No Drawings

COATING SOLUTION FOR TREATING BASEMENT WALLS

This is a continuation of application Ser. No. 08/221,039, filed Mar. 31, 1995, now abandoned which is a division of application Ser. No. 07/632,130, filed Dec. 20, 1990, now U.S. Pat. No. 5,362,531.

TECHNICAL FIELD

The present invention relates to protective coatings for basement walls and more particularly it relates to an organic solvent solution adapted to be applied to the walls. Even yet more specifically this invention relates to an organic solvent solution containing a hydrocarbon resin and a block copolymer.

BACKGROUND OF THE INVENTION

Many coatings, primarily asphaltic based, have been applied from organic solvent solutions to basement walls to provide a water resistant feature to the walls. This application is commonly referred to in the art as "waterproofing". Additionally, it is common to apply protection board to the exterior of a basement wall over such a coating. Foamed polystyrene is used for this purpose as are fiberglass batts. The protective board can also be of sufficient thickness to provide thermal insulation. Such board can also be of assistance in draining water away from the walls.

In order for such basement wall coatings and the solutions containing them to perform satisfactorily and be accepted in the industry there is a need for those materials to possess a wide balance of properties. The coating should possess elastomeric properties, have good strength and toughness and water-resistant qualities. Additionally, since such coatings typically have more than one solid ingredient in the formulation, compatibility of the ingredients is extremely important. Otherwise, over time, separation of the phases or ingredients will result and the coating will become unsatisfactory. Such separation can result in localized areas where the elastomeric properties and the strength or toughness qualities or the water-resistant qualities of the coating would be adversely effected and can also result in insufficient tack to properly hold the protective board to the wall. Local areas of brittleness are also likely to result when separation occurs.

It is generally preferred to apply the protective board to the basement coating while the coating is still wet. Many times, however, it is simply not possible to do this. Consequently, there is a need that the coating, when in the dry condition, also possess an aggressive residual tack to allow, if need be, the application of such protective board after the coating is dry. Because of the lack of residual tack, some systems call for the use of mechanical fastening, e.g. nailing of the protective board to attach it. This is obviously unsatisfactory because it puts holes in the coating. Consequently if such coatings possessed the needed tack there would be no need to jeopardize the integrity of the coating to apply the protective board.

In addition to the coating itself possessing the properties noted above, it is important that there be a proper physiochemical interaction between the coating and the solvent so that the solution itself possesses certain needed properties. Some of these properties are unique to the solvent system itself.

As generally indicated above, it is preferred that the insulating board be applied while the coating is still wet. Consequently, it is extremely important that the solvent system be such that it does not adversely effect, i.e. dissolve, the foamed polystyrene protective board. There is also a need that the coating solution be of a high solids content and that it likewise be of a sprayable viscosity. This is necessary for economical, practical application. This, of course, requires that the solvent system have proper solvation characteristics with respect to the components of the coating.

When the coating is applied there is a need that it not exhibit significant sag, run-down or cobweb formation. Any of such features, if present, severely detrimentally impacts coating quality. While serious sag and run-down are not acceptable, nonetheless, there is also a need that the solution sufficiently fill or wet-out voids and pock marks in the surface of cementitious basement walls. Obviously this balance of properties is not easily attained.

Applicants have found the solvent system also needs to have the proper evaporation rate. (Evaporation rates are well known and are measured by ASTM Test D-3539. The higher the number for the evaporation rate the greater the volatility. As a standard, normal-butyl acetate is given an index of one and other materials are compared to that rate.) If the evaporation rate is too low, for example less than about 1.5 or so, the drying rate is too slow and causes problems in the field. When rates are higher, for example 3.5 and greater, such solvents can cause foaming and cobwebbing problems, either of which result in poor quality coatings.

It is also important that the coating solution maintain consistent properties over the temperature range of application. Since the present coatings are desirably applied by spraying, it will be apparent that viscosity is quite important. Moreover since these type coating solutions are typically applied at elevated temperatures, for example about 105° F. to about 160° F., there is a need that the viscosity in this temperature range be substantially constant.

Finally there is a need that the components of the coating not be prohibitive from a cost point of view.

The present invention provides for a coating and for a coating solution which satisfies these many needs. These coatings possess the needed properties for a, so-called, "waterproofing" coating.

DISCLOSURE OF THE INVENTION

In accordance with the present invention an elastomeric coating is provided which is strong, tough, water-resistant, and possesses excellent residual tack and is composed of two compatible materials.

The present invention also provides for a coating solution in which the solution does not significantly detrimentally attack, or dissolve, foam polystyrene protective board. The solution has a critically important evaporation rate and includes a solvent system with controlled dissolution powers for the solid coating constituents. The solution when applied will not be plagued by unacceptable sag, run-down or cobwebbing and, yet, has the ability to sufficiently flow and wet-out to fill holes and pockmarks in concrete walls. The solution also has a convenient important sprayable viscosity which viscosity is surprisingly essentially constant in the coating application temperature range of about 105° F. to about 160° F. Furthermore, the solution and coating is free of asphalt, thereby allowing the solution and coating to be colorized for identification purposes.

Thus, in accordance with the invention, an asphalt free organic solvent solution for coating basement walls is provided. The solution comprises a coating of (i) a hydrocarbon resin, and (ii) a polystyrenepolyisoprene or a polystyrenepolyisoprene-polystyrene block copolymer or a polystyrene-polybutadiene block copolymer or a polystyrene-polybutadiene-polystyrene block copolymer or mixtures thereof, which is dissolved in (iii) a solvent mixture of toluene and an aliphatic petroleum distillate which is a mixture of paraffinic and cycloparaffinic hydrocarbons. The distillate has a boiling range of about 190° F.–230° F., a flash point of about 18° F. a specific gravity of between about 0.709 to about 0.732 and an evaporation rate of about 2.2–2.6. The solvent has between about 80% to about 95% (weight) of the distillate and about 20% to about 5% of toluene. Typically the weight ratio of (i) to (ii) will be between about 2:1 to about 1:2. Desirably the solvent coating solution will be about 30% to about 60%, preferably 40%–60% by weight of the resin and block copolymer (based on the total weight of the solution).

The hydrocarbon resin desirably will be a polyterpene resin or a petroleum hydrocarbon resin or mixtures thereof. These resins are commonly sold as tackifiers.

The solutions can be formed using conventional mixing equipment and are preferably applied to the exterior of basement walls by spraying.

DETAILED DESCRIPTION OF THE INVENTION INCLUDING THE BEST MODE

The coating solutions of the present invention may be applied at temperatures as low as 15° F. and it is preferred to apply the solutions while the solution temperatures themselves are between about 105° F. to about 160° F. Additionally, it is preferred that an airless spray be employed to apply the coating. One suitable technique is to employ a Graco 733 airless sprayer using approximately 1500–3000 psi pressure at about 130° F. Desirably the application rate to poured concrete walls or parged concrete block walls will be approximately 30–40 square feet per gallon and for high density concrete block about 22–27 square feet per gallon. These rates will typically provide a desired dried coating thickness of on the order of about 0.025 inch to about 0.035 inch.

The coatings of the present invention have an elongation (ASTM D412 Die C) of 1150%. The coatings are flexible to minus 20° F. (tested by bending around a 0.5 inch mandrel) and the abrasion resistance is less than about 0.1% membrane loss (measured using 700 psi on a 0.06"×0.06" point moving across a coating membrane at the rate of about 1 inch per second). The crack bridging ability (ASTM 836) exceeds ten cycles to ⅛ inch at minus 15° F. The water vapor permeance as measured by ASTM E96 (water method) is about 0.21 perms for 40—mil dry coating grams per square foot per hour in Hg. The coatings also show excellent resistance to bacterial attack, to degradation in soil, to algae and fungus. Based on visual inspection the coatings have excellent resistance to chemicals typically found in soils and have good solvent resistance compared to asphaltic based products.

The coating itself, as indicted, is a mixture of a hydrocarbon resin and polystyrene-polyisoprene block copolymers or polystyrene-polyisoprene-polystyrene block copolymers or polystyrene-polybutadiene block copolymers or polystyrene-polybutadiene, hereinafter for convenience simply referred to as block copolymers or S-I polymer or S-I-S polymer or S-B polymer or S-B-S polymers.

The block copolymers employed in the present invention are well-known in the art and are commercially available. Generally the molecular weight of these polymers is not critical but suitably will be in the range of about 60,000 to about 180,000. Similarly, the styrene content and the butadiene, or isoprene, content are not critical but typically the styrene content will be between about 10 or 15% to about 30 or 35% (weight). Preferred materials are commercially available under the trademark KRATON and are supplied by the Shell Chemical Company.

The hydrocarbon resins which are employed are also commercially available. The hydrocarbon resin may be a polyterpene resin or a petroleum hydrocarbon resin. Polyterpene resins are typically formed by polymerizing $C_{10}H_{16}$ monomers, e.g. one or more of alpha-pinene, beta-pinene, limonene, dipentene, beta-phellandrene, myrcene, 3-carene, camphene and terpinolene.

The hydrocarbon resin can also be a petroleum resin, that is, a resin produced by the polymerization of cracked petroleum distillates. Such hydrocarbon resins can be formed by polymerizing aliphatic olefins and diolefins having four to six carbon atoms. Typically the olefins and diolefins consist primarily of monomers having five carbon atoms. Most desirably the hydrocarbon resin will be provided with some aromaticity. The aromaticity can be provided by polymerizing the monomers in the presence of styrene or an alpha-methyl styrene. Less suitably the styrene and alpha-methyl styrene can be separately polymerized and blended in with the $C_4$-$C_6$ polymerized resin. These hydrocarbon resins are solid at room temperature. Exemplary formulations can be found in U.S. Pat. No. 3,577,398. Representative of the monomers which are typically included are isoamylene (2,2 dimethyl-1-propene), piperylene (1,3 pentadiene), isoprene (2-methyl- 1,3 butadiene), 2-methyl-1 butene and 2 methyl-2 butene. Typically the hydrocarbon resins have softening points in excess of about 60° or 70° C. and usually in the range of about 60° C. to about 180° C. Most desirably they have softening points in excess of about 100° C. Commercially available hydrocarbon resins suitable for use in the present invention are those tackifiers supplied under the trade designation WINGTACK and specifically WINGTACK "PLUS" "115", "86", and "95". Others include the resins supplied commercially under the designation NEVTAC such as, for example, NEVTAC 100 and SUPER NEVTAC 99. It is particularly preferred to employ the PM-60827 material which is available from Minnesota Mining and Manufacturing Company. This material includes a block copolymer as well as a hydrocarbon resin and further includes pigments and a processing oil.

The preferred aliphatic petroleum distillate, component of the solvent mixture which is a mixture of paraffinic and cyclo paraffinic hydrocarbons generally has a boiling range of about 190° F.–230° F., a flash point of about 18° F. a specific gravity of between about 0.709 to about 0.732 and evaporation rate of about 2.2–2.6. The majority of the aliphatic petroleum distillate, based on volume, is a mixture of various dimethyl and trimethyl substituted pentenes both linear and cyclic. Typically the petroleum distillate consists primarily of substituted alkanes having 6–8 carbon atoms and will be substantially free of aromatics and substantially free of such compounds as n-heptane and n-hexane. Distillation testing characteristics of a desirable aliphatic petroleum distillate, ° F. (D-86) (D1078) are set forth below.

IBP 190 min (87.8° C.)
10% 195–205 (90.6°–96.1° C.)
50% 200–210 (93.3°–98.9° C.)
90% 210–224 (98.9°–106.7° C.)
Dry Point 230 max (110.0° C.)

A highly preferred petroleum distillate is that which is commercially available from Ashland Chemical Company under the designation LACOLENE aliphatic hydrocarbon.

Desirably the solvent will be between about 80% to about 95% by weight of the petroleum distillate and about 5% to about 20% by weight of toluene. Preferably, however, the distillate will be between about 83 to about 95% by weight of the solvent mixture.

One highly desirable feature of the present invention is that coating solutions exhibit substantially constant viscosity over a wide temperature range, e.g. from about 85° F. to about 160° F. These viscosity values are in the range of about 1000 cps to about 3000 cps, and preferably 1200–2000 cps (Brookfield viscometer, RVT, #4 Spindle, 20 rpm). This constant viscosity obviously is highly beneficial from a practical application point of view. Typically compositions of the present invention will have viscosities (at about 70° F.) of between about 3000 to about 5000, but preferably about 4000–4600 cps.

The many benefits of the present invention as described above can also be obtained by including other ingredients in the formulation provided, of course, that those ingredients, either qualitatively or quantitatively, do not materially change the basic and novel characteristics of the present inventive formulations. Such adjuvants, although not needed for coating basement walls, may include stabilizers, antioxidants and pigments or colorants in amounts suitable to achieve their purpose. Processing oils can also be used. Naphthenic processing oils have functioned well, such as that available from Sun Chemical Co. under their Sunthene designation. Usually the processing oil will be present in an amount of up to about 35% (based on the amount of block copolymer and hydrocarbon resin).

EXAMPLE

One highly preferred composition of the present invention was made by adding LACOLENE solvent and toluene to a stirred tank and then adding PM-60827 to that material followed by stirring for approximately eight hours. The toluene was about 15–17% by weight of the solvent and the PM-60827 was about 50% by weight based on the total weight of constituents. Additionally, approximately 1.5% by weight of a green colorant (Phthalo-Green from American Colors) was used. This coating solution exhibited the needed properties previously discussed when applied to basement walls.

Table I below summarizes additional desirable compositions. The solvent was the same as in the above Example. The resin plus block copolymer (plus adjuvant) was about 50% of the solution with the amount of each, by weight, shown in parenthesis.

TABLE I

| Resin | Block Copolymer | Adjuvant |
| --- | --- | --- |
| Wingtack Plus Resin (50) | Kraton 1107 S-I-S (50) | — |
| Wingtack 95 (45) | Kraton 1101 S-B-S (45) | Sunthene 480 (10) |

TABLE I-continued

| Resin | Block Copolymer | Adjuvant |
| --- | --- | --- |
| Nevtac 100 (55) | Kraton 1102 S-B-S (45) | — |

While the foregoing describes the present invention with sufficient particularity to enable those skilled in the art to make and use same, it will, of course, be apparent that modifications are possible which pursuant to the patent statute and laws do not depart from the spirit and scope of this invention.

We claim:

1. A method of coating an exterior surface of a concrete foundation, comprising the steps of preparing a coating composition comprising a mixture of a hydrocarbon resin and a copolymer selected from the group consisting of a polystyrene-polyisoprene block copolymer, a polystyrene-polyisoprene-polystyrene block copolymer, a polystyrene-polybutadiene block copolymer, a poly-styrene-polybutadiene-polystyrene block copolymer, and mixtures thereof, adding toluene and an aliphatic petroleum distillate as solvents to said mixture in an amount sufficient to provide a homogenous solution having a viscosity of about 3000 to 5000 cps at 70° F., spraying the solution on an exterior surface of a concrete foundation, and thereafter evaporating the solvents to provide a continuous impervious elastomeric coating on said surface.

2. The method of claim 1, wherein the petroleum distillate is a mixture of paraffinic and cycloparaffin hydrocarbons and has a boiling point in the range of about 190° F. to 230° F. and an evaporation rate of about 2.5 to 2.6, said distillate comprising from about 80% to 95% by weight of the combined weight of said distillate and said toluene.

3. A method of coating an exterior surface of a concrete foundation, comprising the steps of applying a solvent solution onto an exterior surface of a concrete foundation, said solvent solution comprising:

(i) a hydrocarbon resin, (ii) a polystyrene-polyisoprene block copolymer or a polystyrene-polyisoprene-polystyrene block copolymer or a polystyrene-polybutadiene block copolymer or a polystyrene-polybutadiene-polystyrene block copolymer or mixtures thereof, and (iii) a solvent mixture of toluene and an aliphatic petroleum distillate which is a mixture of paraffinic and cycloparaffinic hydrocarbons, said distillate having a boiling range of about 190° F. to 230° F., a flash point of about 18° F., a specific gravity of between about 0.709 to about 0.732 and an evaporation rate of about 2.2 to 2.6, said solvent being between about 80% to about 95% by weight of said distillate and about 20% to about 5% of toluene.

4. The method of claim 1, wherein the solution contains from 30% to 60% by weight of said resin and block copolymer with the balance being said solvents.

* * * * *